Patented Apr. 7, 1942

2,278,426

UNITED STATES PATENT OFFICE 2,278,426

DRYING OIL AND PROCESS

Ivor M. Colbeth, Maplewood, N. J., assignor to The Baker Castor Oil Company, New York, N. Y., a corporation of New Jersey No Drawing. Original application December 27, 1939, Serial No. 311,121. Divided and this application February 4, 1941, Serial No. 377,399

6 Claims. (Cl. 260—406)

This invention relates to products obtained by the destructive distillation of borated derivatives of hydroxylated long chain aliphatic compounds, and the process of producing such products. It relates more particularly to the treatment of animal and vegetable oils and derivatives thereof in such a way that products result therefrom that will dry when exposed to the atmosphere. These products can also be polymerized by heating them. They may be prepared so as to be liquids of any desired viscosity ranging from viscosities less than those of the initial substances from which they are produced to extremely viscous gels.

This invention is also applicable to the treatment of compounds and compositions such as animal and vegetable fats, fatty acids and fatty acid esters of mono and dihydric alcohols, as well as polymerization and oxidation products of the same. This is a division of my application Serial No. 311,121, filed December 27, 1939. Application No. 311,121 is a continuation-in-part of my application Serial No. 209,980, filed May 25, 1938.

A very large number of substances can be used as the starting materials. Among the vegetable oils than can be utilized in carrying out this invention are non-drying oils such as castor oil, semi-drying oils such as soya bean, rape, corn, and cotton seed, and drying oils such as linseed and perilla. Among the animal oils that are suitable are whale oil and fish oil, including cod-liver oil. Among suitable fats may be mentioned lard and tallow. Among suitable esters of monohydric alcohols are methyl, ethyl and butyl esters of stearic, hydroxy stearic, oleic, ricinoleic, and linolic acids; and among those of dihydric alcohols are the glycol esters of these acids. The starting substances used in carrying out this invention should contain aliphatic radicals of a sufficient number of carbon atoms to afford opportunity for the formation of one or more double bonds between carbon atoms.

In my prior Patent 2,125,544 of August 2, 1938, I have described how tough resilient products containing boron can be obtained by causing boron compounds to react with certain fatty acid products such as oils, fats, fatty acids, and esters of animal or vegetable origin which contain hydroxyl groups, and have pointed out that when these groups were absent these products could be rendered suitable for making the tough resilient products by oxidizing them so as to form hydroxylated groups.

Upon further investigation I have found that, if, instead of proceeding as disclosed in my Patent 2,125,544, the liquids to be treated are first brought to a temperature of from 260° C. to 300° C. and maintained under a vacuum or atmosphere of inert gas while the boron reagent is added in small increments allowing the reaction to subside each time before further addition of reagent, the resulting product is not a solid even though the quantity of boron had been used which would have resulted in a solid by my prior process, but is a liquid capable of absorbing oxygen and having drying properties.

In carrying out the present invention destructive distillation products of boron derivatives of hydroxylated aliphatic compounds are obtained that have drying properties due to the presence of unsaturated bonds so that they are suitable for coating purposes and for the production of varnishes, lacquers and the like.

The present invention differs from my prior patent above referred to in that the process does not stop when foaming practically ceases and a tough resilient product is obtained, but on the contrary further reaction of the prior product is caused to take place by destructive distillation thus forming products which differ decidedly from the tough resilient product in that they are unsaturated liquids having excellent drying properties.

In this prior patent the reaction with boron is carried on until a tough resilient product is formed. On the other hand, with the present invention the reaction with boron is carried on far beyond this in that decomposition of the borated product is caused to take place involving the removal of hydroxyl groups and the setting up of conjugationed double bonds and the formation of estolides.

Furthermore, this same reaction can be availed of in accordance with the present invention to form unsaturated hydrocarbons from saturated hydrocarbons, unsaturated alcohols from saturated alcohols, unsaturated acids from saturated acids, as well as other unsaturated compounds from the corresponding saturated compounds. This is done by first oxidizing the saturated compound so as to form a hydroxy compound, treating the hydroxy compound with a boron compound capable of reacting with the hydroxyl group, and destructively distilling the borated product. Or such oxidizing agents as chlorine, iodine, etc., may be used in the oxidizing step and the hydroxy group may be then formed by treatment with alkalis such as aqueous sodium hydroxide. Dilute oxidizing agents such as potassium permanganate in alkali solution may be used when desirable. The resulting products may still contain chemically combined boron but not all of them necessarily do so since many boron compounds are volatile and may be removed in the volatile products during the process.

In order to enable this invention to be more readily understood I will describe what appears to me to be the underlying principle of the invention, using castor oil as illustrative of the sort of material that can be used, and showing how boric acid reacts with it. Since castor oil is made up largely of the glyceride of ricinoleic acid, an hydroxy compound, this compound reacts with boric acid thus:

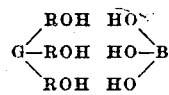

where G represents the glycerine residue and ROH the ricinoleic acid residue. The molecular weight of castor oil may be taken as 932; that of boric acid as 62. The first step at the temperature that is used appears to be the conversion of boric acid into boric anhydride:

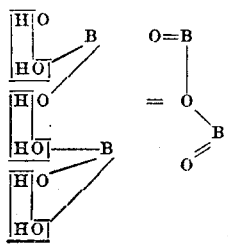

Reaction of $B_2O_3$ with hydroxyl groups in the ricinoleic acid radical in castor oil may take place in various ways such as:

*Case I*

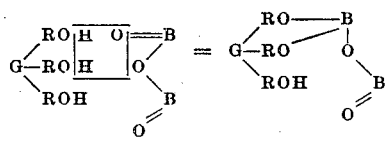

*Case II*

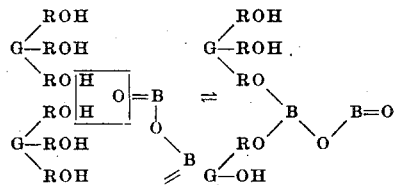

*Case III*

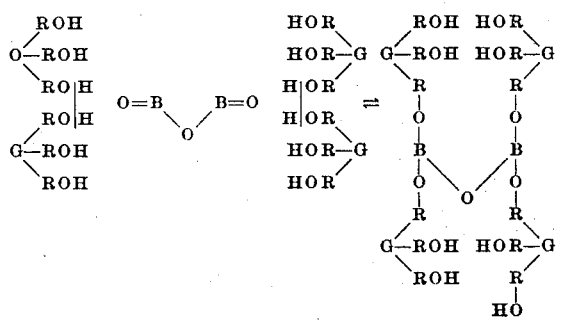

The reactions I through III illustrate in each case one mol of $B_2O_3$. With higher concentrations of $B_2O_3$ numerous combinations and permutations doubtless take place whereby enormously large molecules result.

In Case I, 1 mol of castor oil reacts with 1 mol of $B_2O_3$ to give a product of molecular weight of approximately 976.

In Case II, 2 mols of castor oil react with 1 mol of $B_2O_3$ to give a product of molecular weight of approximately 1908.

In Case III, 4 mols of castor oil react with 1 mol of $B_2O_3$ to give a product of molecular weight of approximately 3710.

The final result depends upon the temperature, the percent of $B_2O_3$ present and time of reaction and the reaction from I to III, and, since the physical properties are function of the molecular complexity, the reaction proceeds from liquids through viscous products to gels with increased time especially rapidly when larger proportions of the boron compound are used.

Further investigation has shown that it is not necessary to use as large an amount of boron in carrying out the present invention as is the case where a tough solid product is desired. However, it is necessary to first form an intermediate viscous product which, when cold, is a gel, and decompose it to form the product of the present invention having drying properties.

When the products illustrated in reactions I–III are heated to very elevated temperature, say about 300° C., there results a rupture of the molecule at a point adjacent the B linkage which is more clearly illustrated thus:

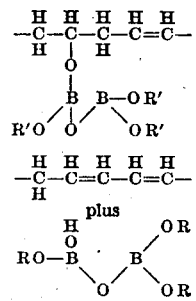

The unfinished chain above represents in detail that portion of the radical R in the neighborhood of the boron linkage, the R' representing the other oil molecules in relation to the boron nucleus.

Since boric acid is freed in the reaction described above, it again reacts with unreacted hydroxyls and the reaction proceeds as above outlined, yielding final products that have chemically combined boron therein. The unsaturated products formed further react intermolecularly with other groups present in the oil to yield estolides.

In the practice of the invention, compounds are formed having drying properties due to the presence of numerous double bonds, and at the same time due to estolide reaction the compounds themselves are of extraordinarily high molecular weight.

Although the underlying principle of this invention has been explained in connection with the treatment of castor oil, it will be understood that aliphatic compounds containing hydroxyl groups or into which hydroxyls can be introduced at such points that thermal decomposition of the borated product will result in unsaturation are also suitable for this invention. If the compounds already contain conjugated bonds it would be unnecessary to treat them in accordance with this invention, but if they contain more than one double bond that are not conjugated, the conjugation of bonds can be effected by this invention. For example, linseed oil contains linolic whose double bonds are unconjugated. By this invention it is first oxidized to form hydroxyl groups and is then treated as described above. Also, raw castor oil may be dry distilled at temperatures between 260° C. and 300° C. until about 5% to about 10% of its weight is lost, and then treated by this process to obtain a drying product.

It has been found that, since boric acid is difficultly soluble in water and also since it is desirable to introduce it into the oil in such a way that it does not become occluded in masses of solidified oil thus preventing its complete reaction with the oil, borax can first be dissolved in water and then decomposed with mineral acids and the entire solution gradually fed into the reacting vessel containing the hot oil. The rapid evaporation of the solution produces microscopic crystals of boric acid which are more readily dissolved by the oil and also facilitates better control of the reaction.

In the case of the use of a semi-drying oil as the starting material the desired reaction is caused to take place by first oxidizing the oil or otherwise treating it to form hydroxyl groups before treating it with a boron compound. The subsequent reaction with $B_2O_3$ and the subsequent decomposition is similar to that already described.

An advantage of first oxidizing the oil and then reacting it with $B_2O_3$ and the subsequent decomposition is similar to that already described.

An advantage of first oxidizing the oil and then reacting it with $B_2O_3$ and decomposing the boron product is that superior drying properties are obtained and greater resistance to darkening or discoloration and greater alkali resistance are acquired, due to the fact that conjugation of double bonds in the molecules takes place.

It has been found that drying oils produced in accordance with this invention, although they may have lower iodine values than natural drying oils, dry as completely and rapidly as the oils are more unsaturated, probably due to the fact that miscelles, or extraordinarily large molecules, are formed which tend to set up gelation in the film on exposure to air.

Ordinary castor oil can be treated with the gradual addition of from 1% to 7% of boric acid. The most desirable quantity will depend on the rapidity with which the reaction takes place, which, in turn, would depend on the rate of heating or the design of the particular apparatus used. For instance, with rapid heat transfer, vigorous stirring and provision for foam arresting, the larger percentages may be used. About 1%–3% is usually preferable.

The following specific examples of carrying out the invention are given for illustrative purposes but it is to be understood that the invention is not limited to the particular starting materials or details mentioned.

*Example I*

Ordinary commercial castor oil is mixed with 1% of boric anhydride acid. The boric acid is dissolved in alcohol or water and then added to the oil. The mixture is heated in a still that is maintained under a vacuum of about 25 mm. As the temperature rises, the first reaction causes the formation of water due to dehydration of the boric acid and the reaction of the resulting boric anhydride with the castor oil. The temperature is increased very slowly up to about 260° C., whereupon the product begins to decompose and a number of volatile acids, heptaldehyde, and water distill from the mixture. After the initial decomposition has begun the temperature is rapidly increased to about 300° C. and maintained at the increased temperature until the desired drying qualities have been produced. The temperature increment is about 1° C. per minute up to the temperature of decomposition, and then about 5° C. per minute to reach the higher temperature desired.

When it is desired to produce a more viscous oil, this can be done merely by continuing the heating. In this way the viscosity can be continuously increased until the product is a gel which still has drying properties. The drying of the product can be accelerated by the use of driers usually used in the paint industry.

*Example II*

Soya bean oil is oxidized at 100° C. by means of air until the iodine value has been reduced to 90. The product so formed is treated with 3% boric anhydride as described above in Example I.

*Example III*

An aqueous solution of borax containing about 1% of borax is treated with a sufficient amount of sulphuric acid to decompose the borax and keep the resulting boric acid in solution. This solution is gradually added to commercial castor oil while it is at a temperature of about 260° C., whereupon vigorous reaction takes place. After a sufficient amount of the solution has been added to have present about 1% of boron in comparison to the castor oil, the temperature is rapidly raised to 300° C. and maintained until the index of refraction of the oil has reached 1.4820 at 25° C. The resulting product is a light colored drying oil.

*Example IV*

Acetylated castor oil is treated as Example III. The reaction proceeds similarly except there distills from the mixture a volatile product of waxy appearance containing boron, thus having a drying product that is almost if not entirely free from chemically combined boron.

What is claimed is:

1. A destructive distillation residual product of a boron derivative of an oxidized aliphatic compound, said product being unsaturated.

2. A destructive distillation residual product of a boron derivative of an oxidized ester of a hydroxy aliphatic acid, said product being unsaturated.

3. A destructive distillation residual product of a boron derivative of an oxidized glyceride of a hydroxy aliphatic acid, said product being unsaturated.

4. The process of treating an oxidized aliphatic compound with a boron compound until a boron derivative is obtained, and destructively distilling said compound.

5. The process of treating an oxidized ester of a hydroxy aliphatic acid with a boron compound until a boron derivative is obtained, and destructively distilling said compound.

6. The process of treating an oxidized glyceride of a hydroxy aliphatic acid with a boron compound until a boron derivative is obtained, and destructively distilling said compound.

IVOR M. COLBETH.